(12) United States Patent
Wilms et al.

(10) Patent No.: US 9,533,657 B2
(45) Date of Patent: Jan. 3, 2017

(54) WIPER BLADE OF FLAT BAR DESIGN

(75) Inventors: Christian Wilms, Beringen-Koersel (BE); Rudi Kisselmann, Plochingen (DE)

(73) Assignee: Robert Bosch GmbH, Stuttgart (DE)

( * ) Notice: Subject to any disclaimer, the term of this patent is extended or adjusted under 35 U.S.C. 154(b) by 7 days.

(21) Appl. No.: 13/389,112

(22) PCT Filed: Jun. 7, 2010

(86) PCT No.: PCT/EP2010/057870
§ 371 (c)(1),
(2), (4) Date: Apr. 24, 2012

(87) PCT Pub. No.: WO2011/015389
PCT Pub. Date: Feb. 10, 2011

(65) Prior Publication Data
US 2012/0198648 A1 Aug. 9, 2012

(30) Foreign Application Priority Data

Aug. 5, 2009 (DE) .......................... 10 2009 028 233
Aug. 26, 2009 (DE) .......................... 10 2009 028 910

(51) Int. Cl.
*B60S 1/38* (2006.01)
*B60S 1/40* (2006.01)

(52) U.S. Cl.
CPC .............. *B60S 1/3881* (2013.01); *B60S 1/381* (2013.01); *B60S 1/38* (2013.01); *B60S 2001/3829* (2013.01)

(58) Field of Classification Search
CPC ............ B60S 1/38; B60S 1/381; B60S 1/3881

(Continued)

(56) References Cited

U.S. PATENT DOCUMENTS 3,116,509 A * 1/1964 Contant ................ B60S 1/3801
15/250.48
5,459,900 A * 10/1995 Mege ........................ B60S 1/38
15/245

(Continued)

FOREIGN PATENT DOCUMENTS

DE 19756879 7/1999
DE 202007018131 3/2008

(Continued)

OTHER PUBLICATIONS

PCT/EP2010/057870 International Search Report dated Aug. 30, 2010 (3 pages).

*Primary Examiner* — Michael Jennings
(74) *Attorney, Agent, or Firm* — Michael Best & Friedrich LLP

(57) ABSTRACT

The invention relates to a wiper blade (10) of flat bar design composed of a wiper strip (14) comprising a wiper lip (18) connected to a head strip (22) via a tilting web (20), at least one pre-bent, elastic spring rail (46, 52, 54) acting as a supporting element, a connecting element (12) and a spoiler (32) having a flowing profile (34) and a holding profile (38), wherein the spoiler (32) includes in the flowing profile (34) thereof at least one longitudinal channel (44, 48, 50) with a spring rail (46, 52, 54), and the holding profile (38) thereof has at the longitudinal sides thereof free branches (42) opposite each other, directed inward, engaging into respective longitudinal grooves (24) of the head strip (22). According to the invention, the head strip (22) is free of spring rails, and in particular no spring rail (46, 52, 54) will contact the head strip (22).

7 Claims, 2 Drawing Sheets

(58) Field of Classification Search
USPC .......... 15/250.201, 250.43, 250.361, 250.48, 15/250.451
See application file for complete search history.

(56) References Cited

U.S. PATENT DOCUMENTS

| | | | |
|---|---|---|---|
| 6,195,833 B1* | 3/2001 | Geilenkirchen et al. | 15/250.48 |
| 6,671,922 B1* | 1/2004 | Geilenkirchen et al. | 15/250.48 |
| 7,210,189 B2 | 5/2007 | Nacamuli | |
| 7,540,062 B1* | 6/2009 | Huang | 15/250.201 |
| 7,827,652 B2* | 11/2010 | Yang et al. | 15/250.32 |
| 8,099,823 B2* | 1/2012 | Kraemer et al. | 15/250.201 |
| 8,307,493 B2* | 11/2012 | Boland | 15/250.32 |
| 8,359,701 B2* | 1/2013 | De Block | 15/250.201 |
| 2004/0134012 A1* | 7/2004 | Kerchaert | B60S 1/3801 15/250.41 |
| 2005/0138751 A1* | 6/2005 | Bauer | B60S 1/3497 15/250.31 |
| 2007/0204422 A1* | 9/2007 | Machida | B60S 1/38 15/250.43 |
| 2008/0271277 A1* | 11/2008 | Mizote | B60S 1/38 15/250.48 |
| 2008/0289134 A1* | 11/2008 | Boussicot et al. | 15/250.32 |
| 2009/0089956 A1* | 4/2009 | De Block et al. | 15/250.201 |
| 2010/0230426 A1* | 9/2010 | Ku | B60S 1/38 220/735 |

FOREIGN PATENT DOCUMENTS

| | | | |
|---|---|---|---|
| EP | 1232922 | 8/2002 | |
| FR | 2851976 | 9/2004 | |
| GB | 2254543 A * | 10/1992 | B60S 1/38 |
| JP | 2008254626 | 10/2008 | |
| RU | 2342294 | 12/2008 | |
| WO | 2007/124989 | 11/2007 | |
| WO | 2008/069464 | 6/2008 | |

* cited by examiner

WIPER BLADE OF FLAT BAR DESIGN

BACKGROUND OF THE INVENTION

The invention is based on a wiper blade of flat bar design. DE 10 2006 020 524 A1 discloses a wiper blade of the type in question. The wiper strip of said wiper blade has a relatively wide head strip in which a longitudinal channel is provided for receiving a spring rail which is approximately rectangular in cross section. The spring rail together with part of the head strip is surrounded by a retaining profile of a spoiler, the mutually facing, free limbs of which retaining profile engage in the head strip in lateral longitudinal grooves below the spring rail. On that side of the spring rail which faces away from a vehicle window, a further longitudinal channel for receiving a second spring rail, which is likewise rectangular in cross section, is arranged in the spoiler. A further longitudinal channel serving to save on material is provided thereabove in the region of an approach flow profile toward a longitudinal ridge of the spoiler. In order to facilitate the installation, the longitudinal channel provided in the spoiler and intended for receiving the second spring rail has a longitudinal gap toward the head strip. The spoiler is produced from a softer material in the region of the approach flow profile than in the region of the retaining profile thereof, wherein the separating surface runs below the second spring rail toward the head strip.

SUMMARY OF THE INVENTION

According to the invention, the head strip is free from spring rails. The limbs of the spoiler can fully engage in longitudinal grooves of the wiper strip head. Parts forming the longitudinal grooves of the head strip for receiving the retaining profile of the spoiler are composed of a harder material than the wiping lip and/or the tilting web. The design according to the invention of the wiper blade enables the head strip to be of very narrow design, and therefore the overall result is a very narrow wiper blade, the width of which is determined by the desired flow conditions at the spoiler rather than by the spring rail arranged in the head strip. The required design and configuration of the supporting elements in the form of spring rails is coordinated with the external design of the spoiler. The spring rails are matched in cross section to the available internal contour of the longitudinal channels, if this is possible taking into consideration the technical demands opposed on the spring properties of the spring rails. One or more spring rails can thus expediently be arranged one above another in parallel and/or next to one another and at least one of said spring rails deviates in cross section from the rectangular shape and the cross sectional contour thereof on the approach flow side follows the internal contour of the associated longitudinal channel. The spoiler profile can therefore be used almost as far as the longitudinal ridge for receiving a spring rail. Substantially trapezoidal or triangular cross sections, the sides of which may also have a curved profile, are produced in this case.

In order to ensure that the spring rails are movable in the longitudinal channels relative to the spoiler without noises being produced or the spring rails jamming, it is expedient for the intermediate spaces between the spring rails and the longitudinal channels to be filled by microcellular rubber or soft rubber.

BRIEF DESCRIPTION OF THE DRAWINGS

Further advantages emerge from the description below of the drawing. The drawing illustrates exemplary embodiments of the invention. The drawing, the description and the claims contain numerous features in combination. A person skilled in the art will expediently also consider the features individually and put them together to form meaningful further combinations.

In the drawing.

DETAILED DESCRIPTION

Figure 1:
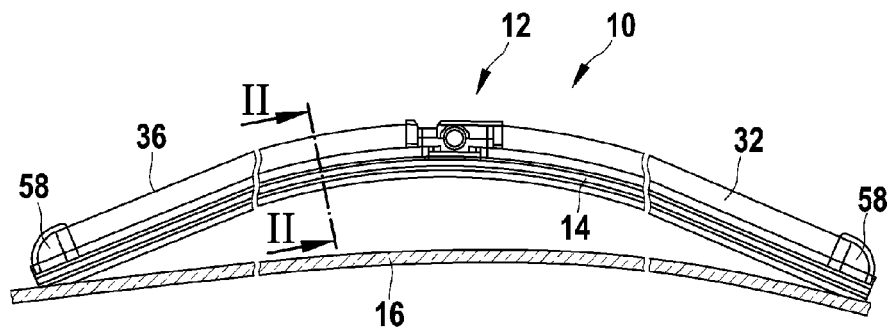
FIG. 1 shows a side view of a wiper blade according to the invention which is supported on a vehicle window without loading.

A wiper blade 10 of flat bar design is constructed from a wiper strip 14, a spoiler 32 and at least one spring rail 46. End caps 58 which limit the relative movability of the wiper strip 14, the spring rail 46 and the spoiler 32 relative to one another in the longitudinal direction, are located at the ends of the wiper blade 10. A connecting element 12 is fastened to the wiper blade 10 in the central region of the wiper blade 10. Said connecting element serves for the articulated connection to a wiper arm (not illustrated specifically). In the unloaded state, the wiper blade 10 is curved concavely towards a vehicle window 16 such that it bears at the ends thereof against the vehicle window 16. In the loaded state, the wiper strip 14 is pressed over the entire length thereof against the vehicle window 16 with a suitable contact pressure.

The wiper strip 14 comprises a wiping lip 18 which is connected to a head strip 22 via a tilting web 20. Lateral support strips 28 which promote the folding-over of the wiping lip 18 in the reversal positions of the wiper blade 10 during the wiping mode are provided between the tilting web 20 and the head strip 22.

The head strip 22 has lateral longitudinal grooves 24 in which a retaining profile 38 of the spoiler 32 engages. Use is made for this purpose of L-shaped limbs 40 on the longitudinal sides of the retaining profile 38, said limbs each being connected by one limb to an approach flow profile 34 of the spoiler 32 while the free limbs 42 are directed inward and engage in the longitudinal grooves 24. The longitudinal grooves 24 form a web 26 in-between. That part of the head strip 22 which adjoins the upper side, which faces away from the wiping lip 18, is referred to as a back strip 30 and is surrounded by the retaining profile 38 of the spoiler 32.

The head strip 22 is expediently produced in a multi-material extrusion process from a harder material than the rest of the wiper strip 14, namely the wiping lip 18 and the support strips 28. This results in little friction, which is associated with little wear, between the retaining profile 38 of the spoiler and the head strip 22. In addition, owing to the greater strength, the head strip 22 can be of very narrow design.

The approach flow profile 34 adjoining the retaining profile 38 is produced from a softer material than the retaining profile 38. The spoiler 32 is expediently produced in a multi-material extrusion process. The approach flow profile 34 has a cross-sectional basic structure which is equivalent to a right angled triangle, wherein the right angle lies on the side facing the retaining profile 38. On the opposite side, the spoiler 32 converges to form a narrow longitudinal ridge 36. The outer surfaces of the approach flow profile 34 which outer surfaces are exposed to the airstream can be shaped concavely or convexly on the approach flow side and/or the discharge flow side corresponding to the desired flow ratios at the spoiler 32.

Figure 2:
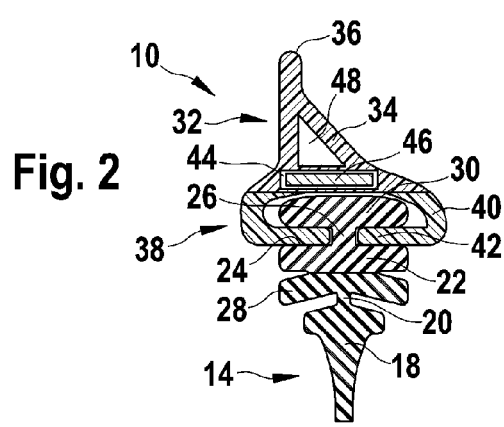
FIG. 2 shows a cross section corresponding to the line II-II in FIG. 1, and FIG. 3 to FIG. 6 show alternatives to FIG. 2.
Figure 3:
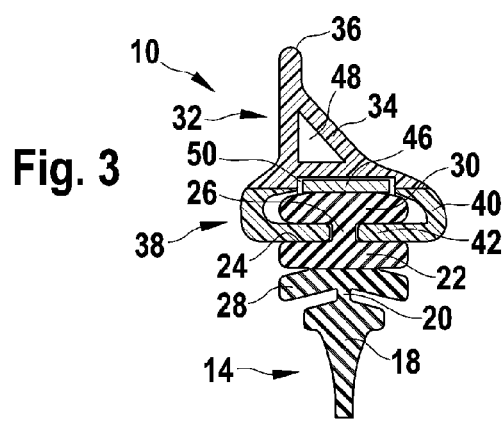
Figure 4:
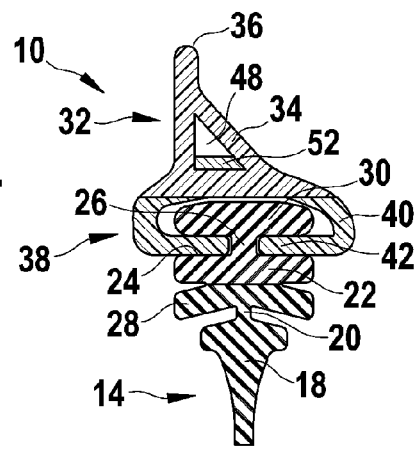
Figure 5:
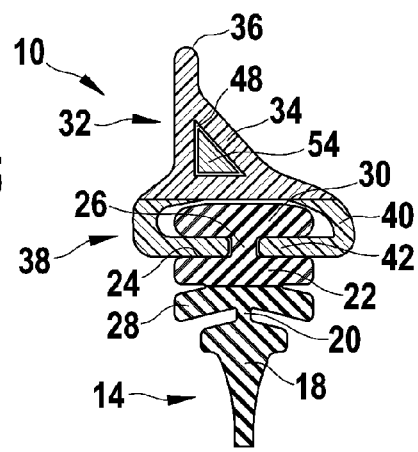
Figure 6:
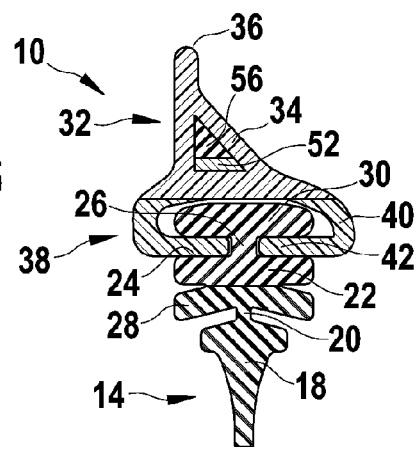

The approach flow profile 34 of the spoiler 32 has at least one first longitudinal channel 44 in which the first spring rail 46 is accommodated. The latter expediently has a flat rectangular cross section. Whereas the first longitudinal channel 44 is closed in the embodiment according to FIG. 2, the first longitudinal channel 50 is open toward the back strip 30, in the configuration according to FIG. 3, and therefore the first spring rail 46 can bear against the back strip 30 of the head strip 22. In both embodiments, a second longitudinal channel 48, the internal contour of which is matched to the external contour of the approach flow profile 34, is located in each case above the first spring rail 46 toward the longitudinal ridge 36. In addition to the first longitudinal channel 44, 50, the second longitudinal channel 48 can serve to receive a further, second spring rail 52, 54 or, as a single longitudinal channel 44, 50, can receive a spring rail 52, 54, corresponding to the configurations according to FIG. 4 to FIG. 6. The second spring rails 52, 54 are at least partially matched to the internal contour of the second longitudinal channel 48, if the desired and required spring properties of the spring rails 52, 54 permit. The second spring rail 52 according to FIG. 4 thus has a substantially trapezoidal cross section while the second spring rail 54 according to FIG. 5 and FIG. 6 has a substantially triangular cross section. In order to permit a certain relative movement between the spring rails 46, 52, 54 and the second longitudinal channels 44, 48 during the wiping mode, it is expedient to fill the intermediate space between the second spring rail 46, 52, 54 and the longitudinal channels 44, 48 with a microcellular rubber or soft rubber. A configuration of this type is illustrated by way of example in FIG. 6. The microcellular rubber or soft rubber 56 on the one hand permits the required small longitudinal displacement in the event of different radii of curvature, but at the same time prevents noises from arising due to contact with the longitudinal channel walls.

The first and second spring rails 46, 52, 54, which are illustrated in FIG. 2 to FIG. 6, and the associated first and second longitudinal channels 44, 48, 50 can be used individually or in combination with one another in a wiper blade 10.

What is claimed is:

1. A wiper blade (10) of flat bar design, comprising a wiper strip (14) having a wiping lip (18) which is connected to a head strip (22) via a tilting web (20), at least one pre-bent, elastic spring rail (46, 52, 54) serving as a supporting element, a connecting element (12) and a spoiler (32) having an approach flow profile (34) and a retaining profile (38), wherein the approach flow profile (34) of said spoiler (32) has at least one longitudinal channel (44, 48, 50) with the at least one spring rail (46, 52, 54) being disposed at least partially within the at least one longitudinal channel (44, 48, 50), and wherein longitudinal sides of the retaining profile (38) of said spoiler have inwardly directed, mutually opposite, free limbs (42) which engage in corresponding longitudinal grooves (24) of the head strip (22), characterized in that the head strip (22) is free from spring rails, wherein the wiper strip (14) has lateral support strips (28) between the tilting web (20) and the head strip (22), the head strip (22) being disposed entirely on an other side of the lateral support strips (28) relative to the wiper lip (18), wherein the retaining profile (38) is composed of a harder material than the approach flow profile (34), and wherein at least the parts forming the longitudinal grooves (24) of the head strip (22) for receiving the retaining profile (38) of the spoiler (32) are composed of a harder material than the wiping lip (18), the tilting web (20), and the lateral support strips (28).

2. The wiper blade (10) as claimed in claim 1, characterized in that the lateral support strips (28) are composed of the same material as the wiping lip (18).

3. The wiper blade (10) as claimed in claim 1, characterized in that the approach flow profile (34) of the spoiler (32) has a first spring rail (46) with a flat cross section running approximately parallel to a back strip (30) of the head strip (22), said spring rail being accommodated in a first longitudinal channel (44, 50) of the at least one longitudinal channel (44, 48, 50) in the vicinity of the head strip (22), and a second longitudinal channel (48) of the at least one longitudinal channel (44, 48, 50) is alternatively or additionally provided in a direction of a longitudinal ridge (36), the second longitudinal channel having an essentially identical contour in cross section as the approach flow profile (34).

4. The wiper blade (10) as claimed in claim 1, characterized in that end caps (58) which limit the relative movement between the spoiler (32) and the spring rails (46, 52, 54) and the wiper strip (14) in a longitudinal direction are arranged at the ends of said wiper blade.

5. The wiper blade (10) as claimed in claim 1, characterized in that the limbs (42) fully enter the longitudinal grooves (24).

6. The wiper blade (10) as claimed in claim 1, wherein the at least one spring rail (46, 52, 54) is enclosed on at least three sides by the approach profile (34) of the spoiler (32).

7. The wiper blade (10) as claimed in claim 6, wherein the at least one spring rail (46, 52, 54) is enclosed on all sides by the approach profile (34) of the spoiler (32).

* * * * *